US012617005B2

(12) United States Patent　　　　　(10) Patent No.:　US 12,617,005 B2
Takashima et al.　　　　　　　　　　(45) Date of Patent:　May 5, 2026

(54) PROCESSING MACHINE

(71) Applicant: DMG MORI CO., LTD., Nara (JP)

(72) Inventors: Shigeyuki Takashima, Nara (JP);
Takeshi Otawa, Nara (JP)

(73) Assignee: DMG MORI CO., LTD., Nara (JP)

( * ) Notice: Subject to any disclaimer, the term of this
patent is extended or adjusted under 35
U.S.C. 154(b) by 371 days.

(21) Appl. No.: 18/565,943

(22) PCT Filed: Jun. 4, 2021

(86) PCT No.: PCT/JP2021/021443
§ 371 (c)(1),
(2) Date: Nov. 30, 2023

(87) PCT Pub. No.: WO2022/254718
PCT Pub. Date: Dec. 8, 2022

(65) Prior Publication Data
US 2024/0261830 A1　　　Aug. 8, 2024

(51) Int. Cl.
B23K 26/34　　　(2014.01)
B08B 15/00　　　(2006.01)
B23K 26/21　　　(2014.01)
B23K 26/342　　　(2014.01)
B23K 26/70　　　(2014.01)
B33Y 30/00　　　(2015.01)

(52) U.S. Cl.
CPC ............ B08B 15/00 (2013.01); B23K 26/342
(2015.10); B23K 26/702 (2015.10); B33Y
30/00 (2014.12)

(58) Field of Classification Search
CPC .... B08B 15/00; B23K 26/342; B23K 26/702;
B23K 26/0093; B23K 26/144; B33Y
30/00; B33Y 40/00; B33Y 50/02; B22F
10/85; B22F 12/38; B22F 12/82; Y02P
10/25; Y02P 70/10
USPC ............ 55/392, 315, 318, 434, 385.4, 385.1
See application file for complete search history.

(56) References Cited

U.S. PATENT DOCUMENTS

| | | | |
|---|---|---|---|
| 2015/0110911 A1* | 4/2015 | Snyder | ................. B29C 64/321 |
| | | | 95/12 |
| 2016/0263610 A1* | 9/2016 | Sakita | .................... B01D 46/04 |
| 2019/0151990 A1 | 5/2019 | Mezawa et al. | |
| 2021/0016502 A1* | 1/2021 | Kawada | ................. B22F 12/55 |

(Continued)

FOREIGN PATENT DOCUMENTS

JP　　　　2017-001078 A　　　1/2017

*Primary Examiner* — Frank M Lawrence, Jr.

(74) *Attorney, Agent, or Firm* — IP Business Solutions,
LLC.

(57)　　　　　　ABSTRACT

A processing machine includes: a first cover body that
compartmentally forms a machining area; a mist collector
that is for collecting mist from machining area; a fume
collector that is for collecting fumes from machining area; a
first pipe that is connected to first cover body, and commu-
nicates with machining area; a second pipe and a third pipe
that branch off from first pipe, and are respectively con-
nected to mist collector and fume collector; and a first
switching valve that is operable between a first switching
mode in which first pipe and second pipe communicate with
each other, and first pipe and third pipe are shut off from
each other, and a second switching mode in which first pipe
and second pipe are shut off from each other, and first pipe
and third pipe communicate with each other.

5 Claims, 7 Drawing Sheets

(56) References Cited

U.S. PATENT DOCUMENTS

| | | | |
|---|---|---|---|
| 2022/0118524 A1* | 4/2022 | Nakamura | B29C 64/25 |
| 2023/0074507 A1* | 3/2023 | Peach | B29C 64/364 |

* cited by examiner

PROCESSING MACHINE

TECHNICAL FIELD

The present invention relates to a processing machine.

BACKGROUND ART

For example, Japanese Patent Laying-Open No. 2017-1078 (PTL 1) discloses a processing machine that includes: a tool spindle that holds a tool for subtractive manufacturing for a workpiece; and an additive manufacturing head that is detachably attached to the tool spindle, and discharges material powder and emits laser light during additive manufacturing for a workpiece.

CITATION LIST

Patent Literature

PTL 1: Japanese Patent Laying-Open No. 2017-1078

SUMMARY OF INVENTION

Technical Problem

When subtractive manufacturing (SM) for a workpiece is performed using coolant, the coolant heated by processing heat becomes mist (atomized). Possible exhaust of such mist to the outside of the machine becomes a cause of contamination in a factory. Accordingly, a mist collector for collecting mist caused in a machining area is used. In additive manufacturing (AM) for a workpiece, or workpiece processing using laser light, such as a laser process, fumes that are dust caused by heating metal occur in the machining area. The fumes also become a cause of contaminating the inside of the factory. Accordingly, a fume collector for collecting the fumes is used.

However, if a hybrid-type processing machine that can perform the subtractive manufacturing processing for a workpiece, and the additive manufacturing processing or the laser processing for a workpiece is provided with both the mist collector and the fume collector, there is a possibility that mist is collected by the fume collector and fumes are collected by the mist collector. Accordingly, there is anxiety that the intrinsic performances of the fume collector and the mist collector are impaired.

On the other hand, as measures for solving such anxiety, a configuration is conceivable in which a mist collecting port and a fume collecting port for the machining area are provided in a manner separated from each other. However, in this case, the mist collecting port and the fume collecting port are separately open at the machining area. Accordingly, there is a possibility that a limitation on the space occurs at a cover body that compartmentally forms the machining area.

Accordingly, the object of the present invention is to solve the problem described above, and to provide a processing machine in which no limitation on the space occurs at the cover body compartmentally forming the machining area, and which can appropriately collect mist and fumes respectively by the mist collector and the fume collector.

Solution to Problem

A processing machine according to the present invention includes: a first cover body that compartmentally forms a machining area; a mist collector that is for collecting mist from the machining area; a fume collector that is for collecting fumes from the machining area; a first pipe that is connected to the first cover body, and communicates with the machining area; a second pipe and a third pipe that branch off from the first pipe, and are respectively connected to the mist collector and the fume collector; and a first switching valve that is operable between a first switching mode in which the first pipe and the second pipe communicate with each other, and the first pipe and the third pipe are shut off from each other, and a second switching mode in which the first pipe and the second pipe are shut off from each other, and the first pipe and the third pipe communicate with each other.

According to the processing machine having such a configuration, the first pipe communicating with the mist collector and the fume collector respectively through the second pipe and the third pipe is connected to the first cover body. Consequently, in comparison with a case in which the second pipe and the third pipe are connected to the first cover body, the first pipe can be connected to the first cover body in a more compact range. By operating the first switching valve in the first switching mode, mist caused in the machining area is collected by the mist collector through the first pipe and the second pipe, while the mist is prevented from flowing toward the fume collector through the first pipe and the third pipe. By operating the first switching valve in the second switching mode, fumes caused in the machining area are collected by the fume collector through the first pipe and the third pipe, while the fumes are prevented from flowing toward the mist collector through the first pipe and the second pipe.

Consequently, the processing machine in which no limitation on the space occurs at the first cover body compartmentally forming the machining area, and which can appropriately collect mist and fumes respectively by the mist collector and the fume collector can be achieved.

Preferably, the first switching valve is provided at a branch position between the first pipe, and the second pipe and the third pipe.

According to the processing machine having such a configuration, the first switching valve that can operate between the first switching mode and the second switching mode can be simply configured.

Preferably, the processing machine further includes a control device that controls operation of the first switching valve so that the first switching mode is selected in subtractive manufacturing for a workpiece, and the second switching mode is selected in additive manufacturing for a workpiece.

According to the processing machine having such a configuration, at timing when mist occurs in the machining area, the first switching valve can be operated in the first switching mode, and at timing when fumes occur in the machining area, the first switching valve can be operated in the second switching mode.

Preferably, the processing machine further includes: a powder feeder that is for supplying powder toward an inside of the machining area; a second cover body that compartmentally forms a space that stores the powder feeder; a fourth pipe that branches off from a pipe path of the third pipe, is connected to the second cover body, and communicates with the space; and a second switching valve that is operable between a third switching mode in which the third pipe and the fourth pipe are shut off from each other, and a fourth switching mode in which the third pipe and the fourth pipe communicate with each other.

According to the processing machine having such a configuration, when the first switching valve is in the second switching mode, operation of the second switching valve in the third switching mode allows fumes caused in the machining area to be more efficiently collected by the fume collector. By operating the second switching valve in the fourth switching mode, powder scattered in the space for storing the powder feeder can be collected by the fume collector through the fourth pipe and the third pipe. In this case, when the first switching valve is in the second switching mode, collection of fumes from the machining area to the fume collector, and collection of powder from the space storing the powder feeder to the fume collector can be executed at the same time.

Preferably, the processing machine further includes a control device that controls operation of the second switching valve so that while the powder feeder is not being replenished with powder, the third switching mode is selected, and while the powder feeder is being replenished, the fourth switching mode is selected.

According to the processing machine having such a configuration, at timing when no powder is scattered in the space storing the powder feeder, the second switching valve can be operated in the third switching mode, and at timing when powder is scattered in the space storing the powder feeder, the second switching valve can be operated in the fourth switching mode.

Advantageous Effect of Invention

As described above, according to the present invention, a processing machine in which no limitation on the space occurs at the cover body compartmentally forming the machining area, and which can appropriately collect mist and fumes respectively by the mist collector and the fume collector can be provided.

DESCRIPTION OF EMBODIMENTS

Figure 1:
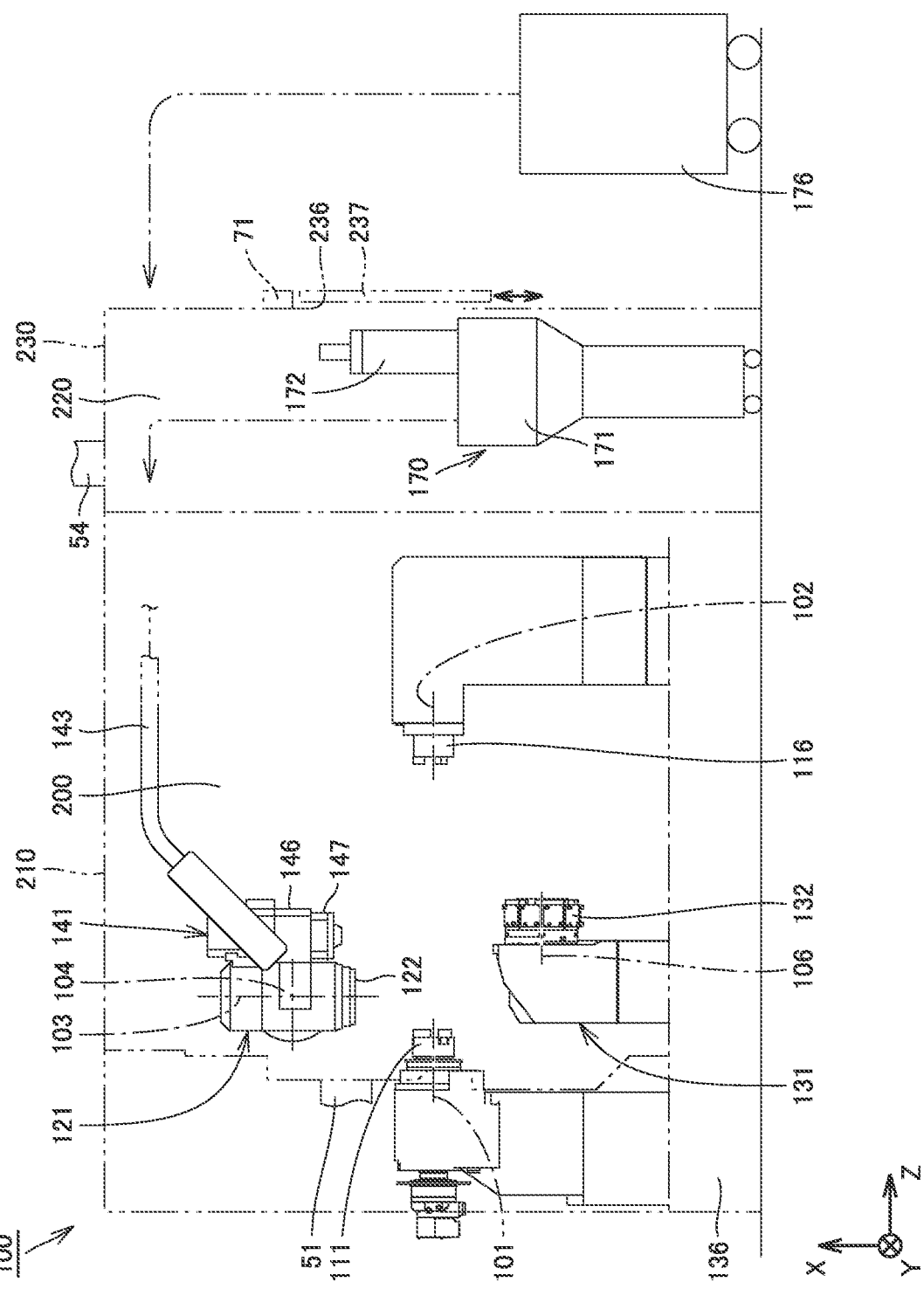
FIG. 1 is a front view showing a processing machine in an embodiment of the present invention.

Referring to the drawings, embodiments of the present invention are described. Note that in the drawings to be referred to below, the identical or equivalent members are assigned the same numbers.

Figure 2:
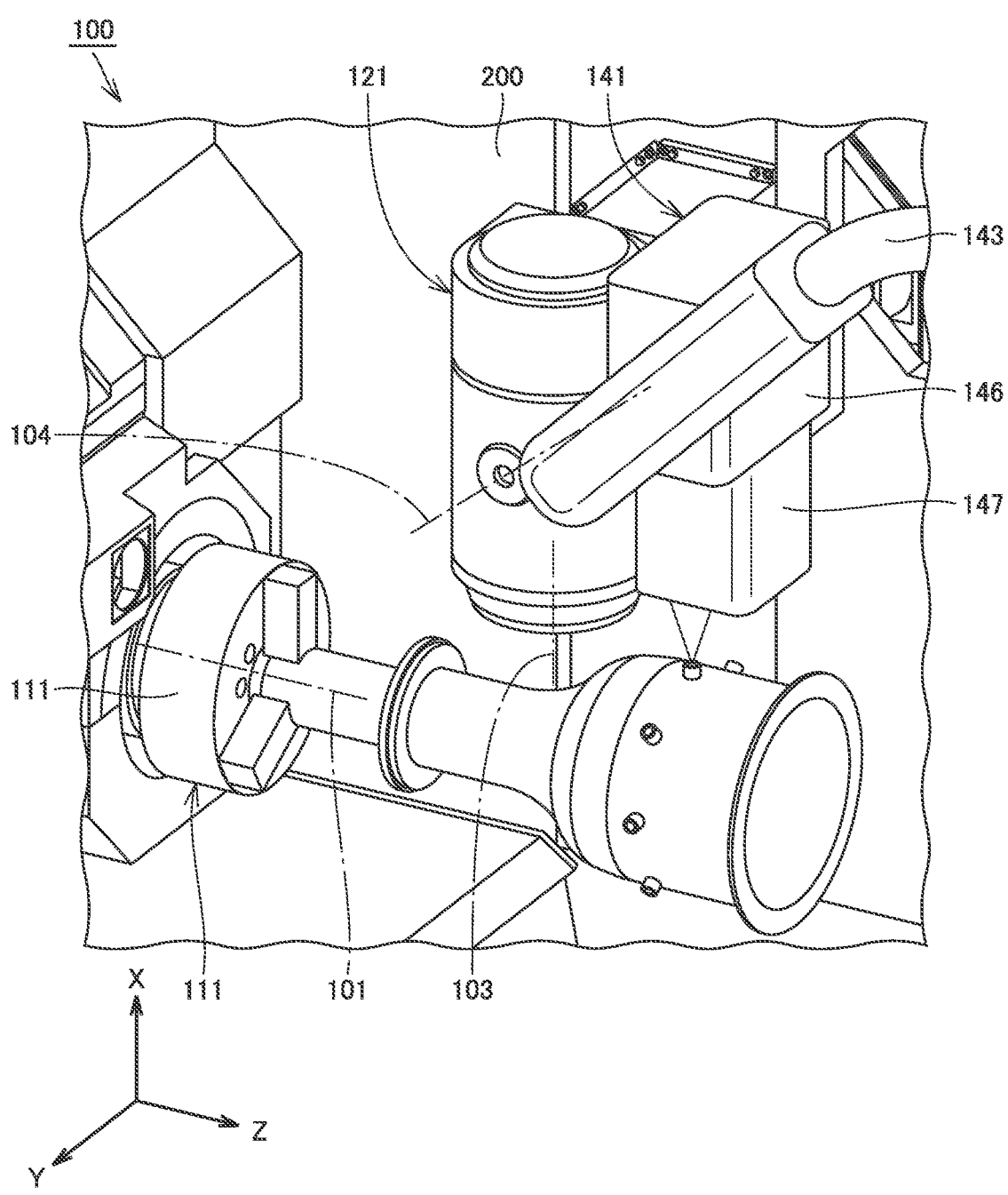
FIG. 2 is a perspective view showing situations in a machining area during additive manufacturing in a processing machine in FIG. 1.

FIG. 1 is a front view showing a processing machine in an embodiment of the present invention. In FIG. 1, with a transparent view through a cover body forming an appearance of the processing machine, the inside of the processing machine is shown. FIG. 2 is a perspective view showing situations in a machining area during additive manufacturing in the processing machine in FIG. 1.

Referring to FIGS. 1 and 2, a processing machine 100 is an AM/SM hybrid processing machine capable of additive manufacturing processing for a workpiece and subtractive manufacturing processing (cutting machining) for a workpiece. Processing machine 100 has a turning function using a fixed tool, and a milling function using a rotating tool, as SM processing functions.

Processing machine 100 is an NC (Numerically Controlled) processing machine where various operations for workpiece processing are automated by numerical control by a computer.

Note that in this Description, an axis that is in parallel with the lateral direction (width direction) of processing machine 100 and extends in the horizontal direction is called "Z-axis", an axis that is in parallel with the front-back direction (depth direction) of processing machine 100 and extends in the horizontal direction is called "Y-axis", and an axis extending in the vertical direction is called "X-axis". The X-axis, the Y-axis, and the Z-axis are three axes that are orthogonal to each other.

First, the entire structure of processing machine 100 is described. Processing machine 100 includes a first cover body 210. First cover body 210 compartmentally forms a machining area 200.

Machining area 200 is a space in which a workpiece is processed, and is hermetically closed so as to prevent chips and coolant (mist) accompanying the subtractive manufacturing for the workpiece and fumes accompanying the additive manufacturing for the workpiece, from leaking to the outside of machining area 200.

Processing machine 100 further includes a bed 136, a first workpiece spindle 111, a second workpiece spindle 116, a tool spindle 121, and a tool rest 131.

Bed 136 is a base member for supporting first workpiece spindle 111, second workpiece spindle 116, tool spindle 121, tool rest 131 and the like, and is installed on a floor surface of a factory or the like.

First workpiece spindle 111 and second workpiece spindle 116 are arranged opposite to each other in the Z-axis direction. First workpiece spindle 111 and second workpiece spindle 116 are configured so as to be capable of holding a workpiece. First workpiece spindle 111 and second workpiece spindle 116 are provided with a chuck mechanism (not shown) for detachably holding a workpiece. Mainly during a turning process for the workpiece using the fixed tool, first workpiece spindle 111 can rotate the held workpiece centered on a rotation axis 101 in parallel with the Z-axis. Mainly during the turning process for the workpiece using the fixed tool, second workpiece spindle 116 can rotate the held workpiece centered on a rotation axis 102 in parallel with the Z-axis.

First workpiece spindle 111 is fixed to bed 136. Second workpiece spindle 116 is provided to be movable in the Z-axis direction by any of various feeding mechanisms, guide mechanisms, servomotors and the like. Second workpiece spindle 116 may have a configuration fixed to bed 136. Instead of second workpiece spindle 116, a tailstock for supporting the rotation center of the workpiece held by first workpiece spindle 111 may be provided.

Tool spindle 121 is provided in machining area 200. Tool spindle 121 is configured so as to be capable of holding a rotating tool for the subtractive manufacturing (milling process) for a workpiece. Tool spindle 121 is provided with a clamp mechanism (not shown) for detachably holding the rotating tool. When the milling process for the workpiece is performed using the rotating tool, tool spindle 121 rotates the held rotating tool centered on a rotation axis 103 in parallel with the X- and Z-axes plane.

Furthermore, tool spindle 121 is provided swingably (B-axis swing) centered on a swing axis 104 in parallel with the Y-axis. Preferably, the swing range of tool spindle 121 is ±90° or more with respect to a reference posture (posture shown in FIGS. 1 and 2) where a spindle end face 122 of tool spindle 121 is oriented downward. For example, the swing range of tool spindle 121 is a range of ±120° with respect to the reference posture.

Tool spindle 121 is supported above bed 136 by a column or the like, not shown. Tool spindle 121 is provided to be movable in the X-axis direction, the Y-axis direction, and the Z-axis direction by various feeding mechanisms, guide mechanisms, servomotors and the like provided at the column or the like. The processing position by the rotating tool attached to tool spindle 121 is three-dimensionally moved.

Although not shown in FIG. 1, around first workpiece spindle 111 there are provided an automatic tool changer (ATC) for automatically changing a tool held by tool spindle 121, and a tool magazine that stores tools that are each for replacement and held by tool spindle 121.

A plurality of fixed tools for a turning process are attached to tool rest 131. Tool rest 131 has what is called a turret shape, allows the fixed tools to be radially attached thereto, and performs swing division.

More specifically, tool rest 131 includes a swing part 132. Swing part 132 can swing centered on a central axis 106 in parallel with the Z-axis. At a position apart by a gap in the circumferential direction centered on central axis 106, a tool holder for holding the fixed tool is attached. By swinging swing part 132 centered on central axis 106, the fixed tool held by the tool holder moves in the circumferential direction, and the fixed tool used for the turning process is positioned.

Tool rest 131 is supported above bed 136 by a saddle or the like, not shown. Tool rest 131 is provided to be movable in the X-axis direction and the Z-axis direction by various feeding mechanisms, guide mechanisms, servomotors and the like provided at the saddle or the like. Tool rest 131 may have a milling function of rotating the rotating tool.

Processing machine 100 further includes an additive manufacturing head 141. Additive manufacturing head 141 discharges powder (material powder) and emits laser light to the workpiece, thereby performing the additive manufacturing (directed energy deposition method). Metal powder, such as of stainless steel, nickel-based alloy, cobalt-base alloy, or titanium, may be used as the powder. Note that the powder is not necessarily metal powder.

Additive manufacturing head 141 includes a head main body 146, and a laser tool 147. Laser light and powder are introduced into head main body 146. Laser tool 147 emits laser light toward the workpiece, and defines a laser light irradiation region on the workpiece. The powder introduced into additive manufacturing head 141 is discharged toward a workpiece through a nozzle (not shown).

Processing machine 100 may include a plurality of laser tools 147 that have varying shapes and/or sizes of laser light irradiation regions defined on the workpiece. In this case, any one laser tool 147 may be selected from among laser tools 147 in accordance with a condition of additive manufacturing to be executed, and be attached to head main body 146.

Additive manufacturing head 141 is detachably provided for tool spindle 121. Additive manufacturing head 141 and tool spindle 121 internally include a clamp mechanism using a spring force or the like. When additive manufacturing head 141 is attached to tool spindle 121, additive manufacturing head 141 is coupled to tool spindle 121 by operation of the clamp mechanism.

In the additive manufacturing for a workpiece, additive manufacturing head 141 is coupled to tool spindle 121, is thus integrated with tool spindle 121, moves in the X-axis direction, the Y-axis direction, and the Z-axis direction, and swings centered on swing axis 104. In the subtractive manufacturing for a workpiece, additive manufacturing head 141 is separated from tool spindle 121, and is stored in a head stocker, not shown.

Processing machine 100 further includes a powder feeder 170, a laser oscillating device 176, and a line body 143.

Powder feeder 170 and laser oscillating device 176 are provided outside of machining area 200. Powder feeder 170 feeds powder to be used for the additive manufacturing, toward additive manufacturing head 141. Laser oscillating device 176 oscillates laser light to be used for the additive manufacturing.

Line body 143 supplies powder from powder feeder 170 to additive manufacturing head 141, and supplies laser light from laser oscillating device 176 to additive manufacturing head 141. Line body 143 extends from additive manufacturing head 141, and is connected to powder feeder 170 and laser oscillating device 176. Line body 143 includes an optical fiber for guiding laser light, a pipe for guiding powder, an air tube serving as a flow path of air, a gas pipe serving as a flow path of inert gas, a cooling pipe serving as a flow path of refrigerant, electrical wiring, and a flexible tube that stores them.

Powder feeder 170 includes a powder hopper 172, a mixer part 171. Powder hopper 172 forms an enclosed space for storing powder used for additive manufacturing. Mixer part 171 mixes powder stored in powder hopper 172 with gas for powder carrier. Powder hopper 172 is detachably provided for mixer part 171.

Processing machine 100 further includes a second cover body 230, and a door part 237. Second cover body 230 compartmentally forms a storage space 220. Storage space 220 is a space separated from machining area 200. Powder feeder 170 is stored in storage space 220.

Second cover body 230 is provided with an opening part 236. Storage space 220 is open to the outside through opening part 236. Opening part 236 is provided at a position facing powder hopper 172. Door part 237 is provided at opening part 236. Door part 237 is operable between an open state in which opening part 236 is open, and a closed state in which opening part 236 is blocked.

When powder feeder 170 is replenished with powder, first, an operator brings the door part 237 into the open state. The operator takes out powder hopper 172 from storage space 220 through opening part 236, and replenishes taken out powder hopper 172 with powder. In this case, another powder hopper 172 preliminarily filled with powder may be prepared. The operator brings powder hopper 172 into storage space 220 through opening part 236, and attaches powder hopper 172 to mixer part 171. Lastly, the operator brings door part 237 into the closed state, thus completing the powder replenishing operation.

Figure 3:
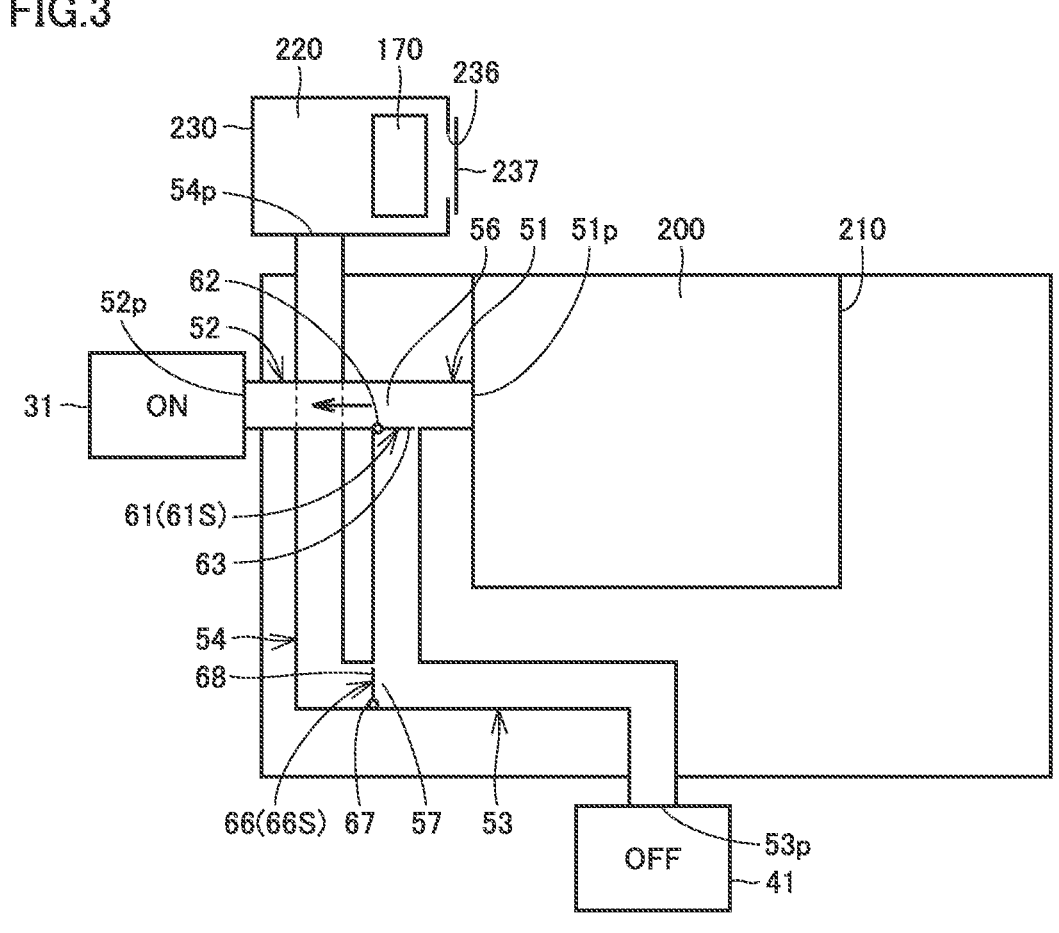
FIG. 3 schematically shows the processing machine during subtractive manufacturing for a workpiece while replenishment with powder is not performed.
Figure 4:
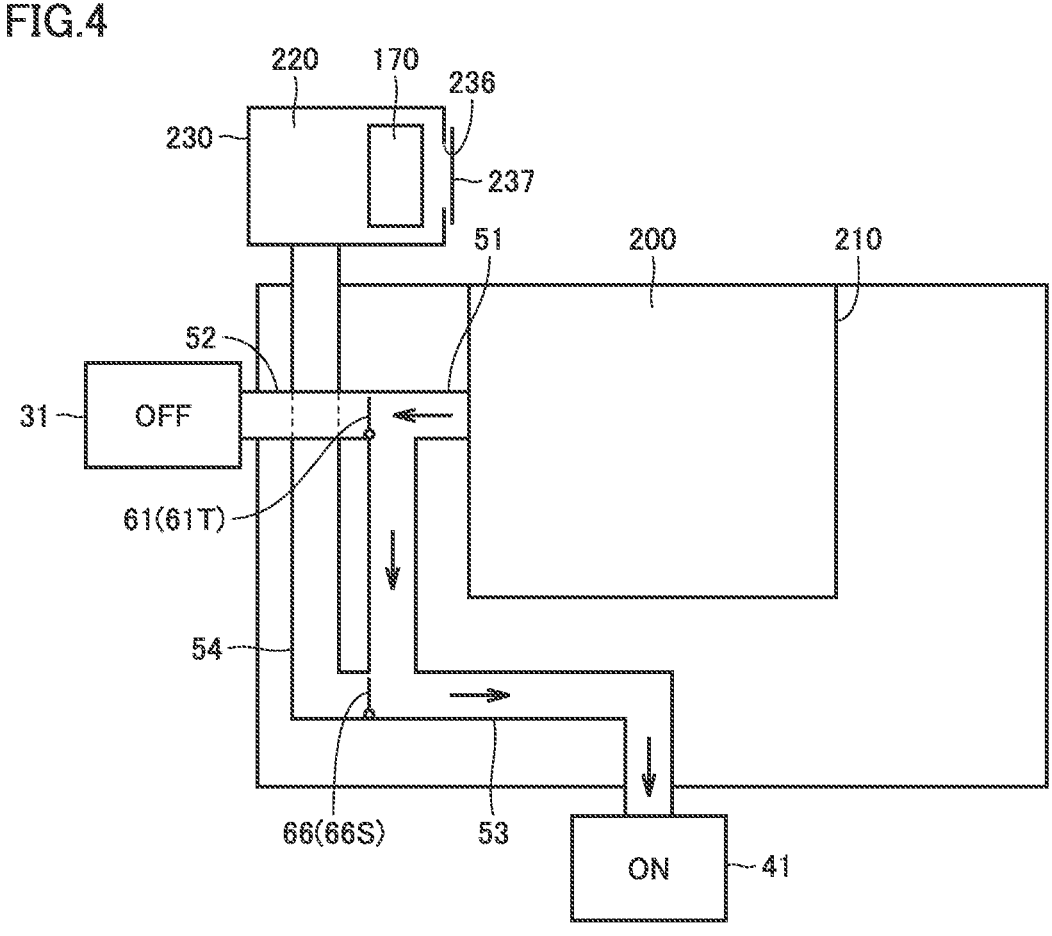
FIG. 4 schematically shows the processing machine during additive manufacturing for a workpiece while replenishment with powder is not performed.
Figure 5:
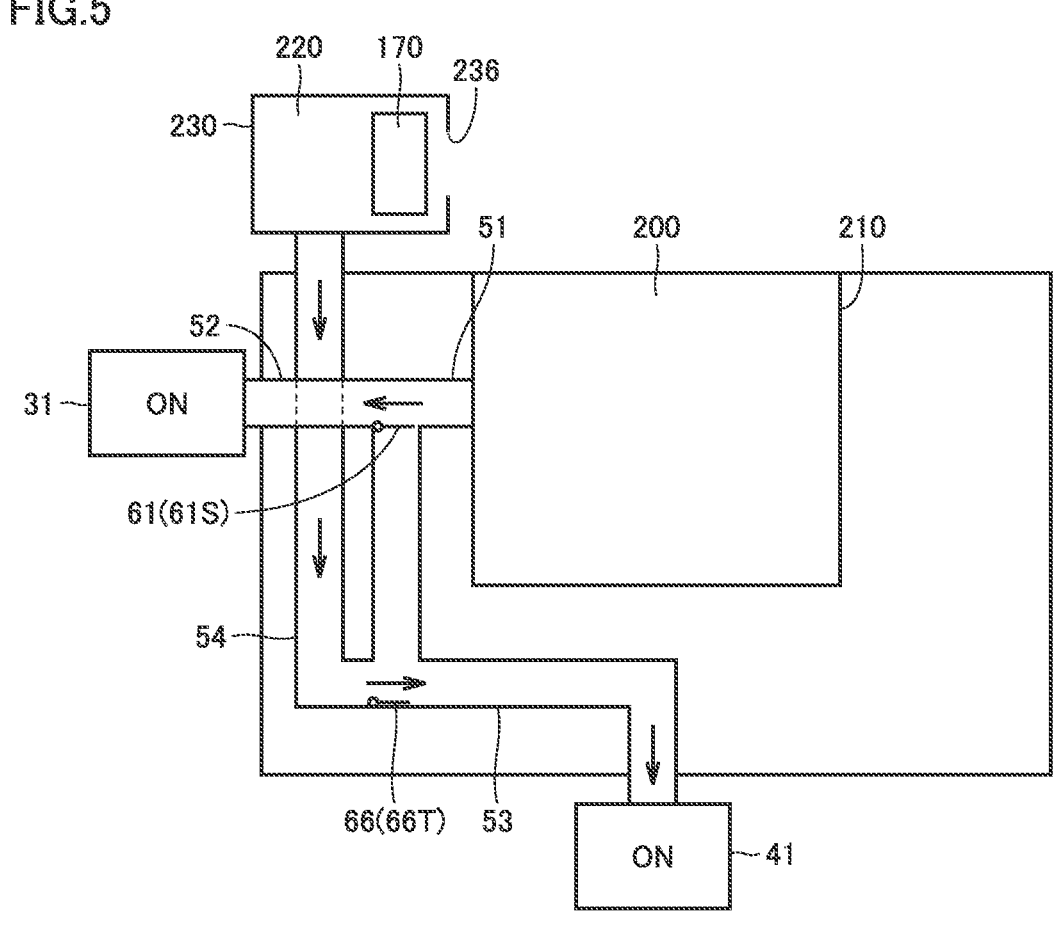
FIG. 5 schematically shows the processing machine during subtractive manufacturing for a workpiece while replenishment with powder is being performed.
Figure 6:
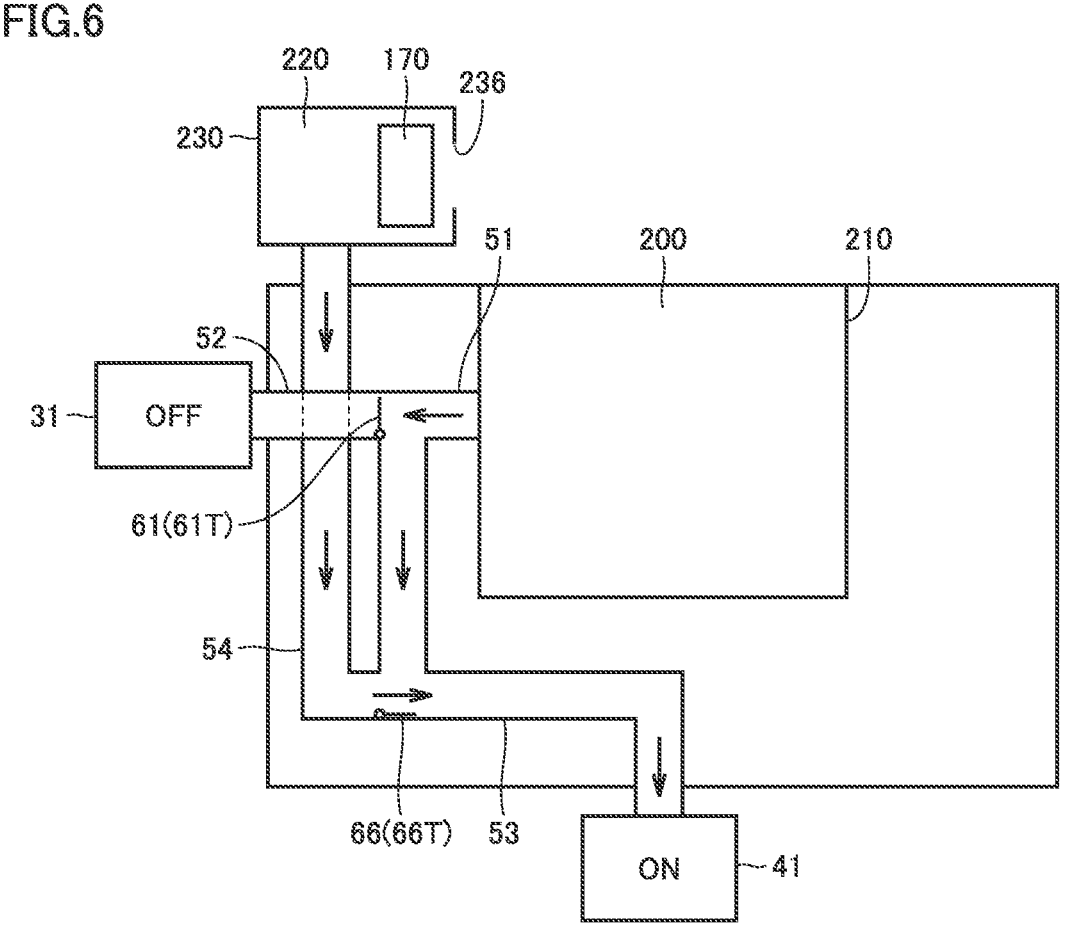
FIG. 6 schematically shows the processing machine during additive manufacturing for a workpiece while replenishment with powder is being performed.

FIG. 3 schematically shows the processing machine during subtractive manufacturing for a workpiece while replenishment with powder is not performed. FIG. 4 schematically shows the processing machine during additive manufacturing for a workpiece while replenishment with powder is not performed. FIG. 5 schematically shows the processing machine during subtractive manufacturing for a workpiece while replenishment with powder is being performed. FIG. 6 schematically shows the processing machine during additive manufacturing for a workpiece while replenishment with powder is being performed.

Referring to FIGS. 1 to 6, processing machine 100 further includes mist collector 31, and a fume collector 41.

When a workpiece is processed using coolant in machining area 200 in the subtractive manufacturing for the workpiece, mist (oil mist) caused by atomization of the coolant heated by processing heat occurs. Mist collector 31 is a device for collecting the mist from machining area 200. In the additive manufacturing for a workpiece, fumes that are dust caused by heating metal are caused in machining area 200. Fume collector 41 is a device for collecting the fumes from machining area 200.

Mist collector 31 is provided outside of machining area 200. Mist collector 31 includes a filter (not shown), and a motor 32 (see FIG. 7 described later). The filter is made up of a mesh body that can collect mist. Motor 32 forms airflow from machining area 200 toward mist collector 31 accompanying the rotation. Mist collector 31 collects oil mist contained in the air through the filter, and exhausts clean air.

Fume collector 41 is provided outside of machining area 200. Fume collector 41 includes a filter (not shown), and a motor 42 (see FIG. 7 described later). The filter is made up of a mesh body that can collect fumes. Motor 42 forms airflow from machining area 200 toward fume collector 41 accompanying the rotation. Fume collector 41 collects fumes contained in the air by the filter, and exhausts clean air.

As shown in FIGS. 1 and 3, processing machine 100 further includes a first pipe 51, a second pipe 52, and a third pipe 53. Each of the pipes, which are first pipe 51, second pipe 52, and a third pipe 53, is made up of a pipe member that allows air to flow therethrough. First pipe 51, second pipe 52, and third pipe 53 are provided outside of machining area 200.

First pipe 51 is connected to first cover body 210. First pipe 51 communicates with machining area 200. First pipe 51 opens at the inside of machining area 200.

The connection position of first pipe 51 to first cover body 210 is not specifically limited. As shown in FIG. 1, first pipe 51 may be connected to a side surface part of first cover body 210 so as to communicate with machining area 200 at a position above first workpiece spindle 111. First pipe 51 may be connected to a ceiling part of first cover body 210 so as to communicate with an upper part of machining area 200.

Second pipe 52 and third pipe 53 branch off from first pipe 51. Second pipe 52 is connected to mist collector 31. Third pipe 53 is connected to fume collector 41.

In this Description, an end of the pipe on the upstream side of airflow formed during operation of mist collector 31 and fume collector 41 is called "one end", and an end of the pipe on the downstream side is called "other end".

First pipe 51 includes a first connection part 51p. First connection part 51p is the one end of first pipe 51. First connection part 51p is connected to first cover body 210. Second pipe 52 includes a second connection part 52p. Second connection part 52p is the other end of second pipe 52. Second connection part 52p is connected to mist collector 31. Third pipe 53 includes a third connection part 53p. Third connection part 53p is the other end of third pipe 53. Third connection part 53p is connected to fume collector 41.

Second pipe 52 and third pipe 53 branch off from first pipe 51 at a first branch part 56. First branch part 56 is the other end of first pipe 51, and the one end of each of pipes that are second pipe 52 and third pipe 53. First pipe 51 extends between first connection part 51p and first branch part 56. Second pipe 52 extends between first branch part 56 and second connection part 52p. Third pipe 53 extends between first branch part 56 and third connection part 53p.

Processing machine 100 further includes a first switching valve 61. First switching valve 61 is operable between a first switching mode 61S which is shown in FIGS. 3 and 5 in which first pipe 51 and second pipe 52 communicate with each other, and first pipe 51 and third pipe 53 are shut off from each other, and a second switching mode 61T which is shown in FIGS. 4 and 6 and in which first pipe 51 and second pipe 52 are shut off from each other, and first pipe 51 and third pipe 53 communicate with each other.

First switching valve 61 is provided at a branch position between first pipe 51, and second pipe 52 and third pipe 53. First switching valve 61 is provided at first branch part 56.

First switching valve 61 includes a first stem 62, a first valve body 63, and a first actuator 64 (see FIG. 7 described later). First stem 62 axially extends. First valve body 63 extends from first stem 62 to the outside of first stem 62 in the radial direction in a plate like manner. First actuator 64 operates and rotates first valve body 63 centered on first stem 62 in accordance with the driving. First actuator 64 is made up of, for example, a piston cylinder. First valve body 63 is disposed so as to open second pipe 52 and block third pipe 53 in first switching mode 61S, and is disposed so as to block second pipe 52 and open third pipe 53 in second switching mode 61T.

The inner wall of first cover body 210 surrounding machining area 200 is provided with a telescopic cover that is deformed as tool spindle 121 moves in the X-axis direction and the Z-axis direction, various shutters that are opened and closed when the automatic tool changer and additive manufacturing head 141 approach and are retracted from machining area 200, and a pipe or the like for discharging coolant. Accordingly, in a case where machining area 200, mist collector 31, and fume collector 41 are caused to communicate through pipes, a limitation on the space of the connection place of the pipes for first cover body 210 occurs.

Unlike this, according to this embodiment, first pipe 51, which communicates with mist collector 31 and fume collector 41 respectively through second pipe 52 and third pipe 53, is connected to first cover body 210. In comparison with a configuration in which second pipe 52 and third pipe 53 are directly connected to first cover body 210, the configuration as described above can connect first pipe 51 to first cover body 210 in a more compact range.

First switching valve 61 is provided at the branch position between first pipe 51, and second pipe 52 and third pipe 53. According to such a configuration, a valve for switching between first switching mode 61S and second switching mode 61T can be achieved by single first switching valve 61, thus allowing processing machine 100 to have a simple configuration.

As shown in FIGS. 1 and 3, processing machine 100 further includes a fourth pipe 54. Fourth pipe 54 is made up of a pipe member that allows air to flow therethrough. Fourth pipe 54 is provided outside of machining area 200.

Fourth pipe 54 is connected to second cover body 230. Fourth pipe 54 communicates with storage space 220. Fourth pipe 54 opens at the inside of storage space 220. Fourth pipe 54 branches off from the pipe path of third pipe 53.

The connection position of fourth pipe 54 to second cover body 230 is not specifically limited. As shown in FIG. 1, fourth pipe 54 may be connected to a ceiling part of second cover body 230 so as to communicate with an upper part of storage space 220.

Fourth pipe 54 includes a fourth connection part 54p. Fourth connection part 54p is the one end of fourth pipe 54. Fourth connection part 54p is connected to second cover body 230. Fourth pipe 54 branches off from third pipe 53 at second branch part 57. Fourth pipe 54 extends between fourth connection part 54p and second branch part 57. Second branch part 57 is positioned between first branch part 56 and third connection part 53p on third pipe 53. Second branch part 57 is disposed at a position away from first branch part 56 on the downstream side of airflow in third pipe 53. Second branch part 57 is disposed at a position away from third connection part 53p on the upstream side of airflow in third pipe 53.

Processing machine 100 further includes a second switching valve 66. Second switching valve 66 is operable between a third switching mode 66S which is shown in FIGS. 3 and 4 and in which third pipe 53 and fourth pipe 54 are shut off from each other, and a fourth switching mode 66T which is shown in FIGS. 5 and 6 and in which third pipe 53 and fourth pipe 54 communicate with each other.

Second switching valve 66 is provided at a branch position between third pipe 53 and fourth pipe 54. Second switching valve 66 is provided at second branch part 57. Note that second switching valve 66 may be provided at any position on the pipe path of fourth pipe 54.

Second switching valve 66 includes a second stem 67, a second valve body 68, and a second actuator 69 (see FIG. 7 described later). Second stem 67 axially extends. Second valve body 68 extends from second stem 67 to the outside of second stem 67 in the radial direction in a plate like manner. Second actuator 69 operates and rotates second valve body 68 centered on second stem 67 in accordance with the driving. Second actuator 69 is made up of, for example, a piston cylinder. Second valve body 68 is disposed so as to block fourth pipe 54 in third switching mode 66S, and is disposed so as to open fourth pipe 54 in fourth switching mode 66T.

Note that shapes, operation and driving scheme of first switching valve 61 and second switching valve 66 are not specifically limited.

Figure 7:
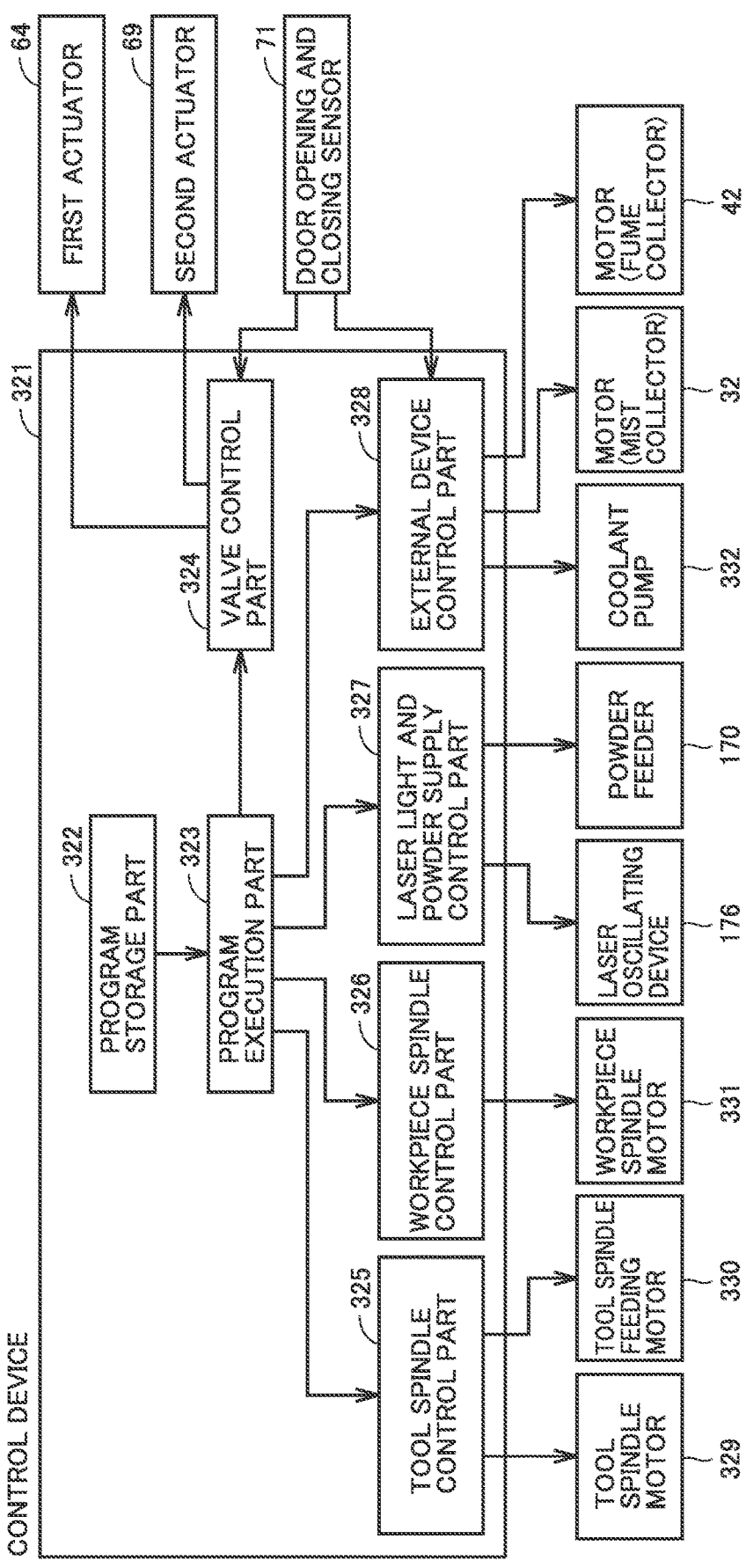
FIG. 7 is a block diagram showing a control system related to operation control of the first switching valve and the second switching valve in the processing machine in FIG. 1.

FIG. 7 is a block diagram showing a control system related to operation control of the first switching valve and the second switching valve in the processing machine in FIG. 1. Referring to FIGS. 1 to 7, processing machine 100 further includes a control device 321.

Control device 321 controls processing machine 100. Control device 321 is internally included in a control board that is provided for processing machine 100 and is for controlling various operations in processing machine 100.

Control device 321 includes a program storage part 322, a program execution part 323, a tool spindle control part 325, a workpiece spindle control part 326, a laser light and powder supply control part 327, and an external device control part 328. Program storage part 322 stores an execution program (numerical control program) for workpiece processing created by the operator of processing machine 100. Program storage part 322 is, for example, a flash memory.

Program execution part 323 executes the execution program stored in program storage part 322. Program execution part 323 reads instructions of the execution program, and outputs control signals to each of control parts that are tool spindle control part 325, workpiece spindle control part 326, laser light and powder supply control part 327, and external device control part 328.

Tool spindle control part 325 controls a tool spindle motor 329 for moving tool spindle 121 according to the control signal from program execution part 323, during the subtractive manufacturing for a workpiece, and a controls tool spindle feeding motor 330 for moving tool spindle 121 in the X-axis direction, the Y-axis direction, and the Z-axis direction, according to the control signal from program execution part 323, during the subtractive manufacturing and the additive manufacturing for a workpiece.

During the subtractive manufacturing and the additive manufacturing for a workpiece, workpiece spindle control part 326 controls a workpiece spindle motor 331 for rotating first workpiece spindle 111, according to the control signal from program execution part 323. Note that although not shown in FIG. 7, similar to first workpiece spindle 111, rotation and movement of second workpiece spindle 116 are controlled according to the control signal from program execution part 323.

During the additive manufacturing for a workpiece, laser light and powder supply control part 327 controls laser oscillating device 176 and powder feeder 170 so as to supply laser light and powder toward machining area 200 according to the control signal from program execution part 323.

During the subtractive manufacturing for a workpiece, external device control part 328 starts to drive a coolant pump 332 according to the control signal from program execution part 323.

During the subtractive manufacturing for a workpiece, external device control part 328 starts to drive motor 32 of mist collector 31 according to the control signal from program execution part 323. During the additive manufacturing for a workpiece, external device control part 328 starts to drive motor 42 of fume collector 41 according to the control signal from program execution part 323. Furthermore, external device control part 328 starts to drive motor 42 of fume collector 41 if determining that door part 237 is in the open state, based on a detection signal from a door opening and closing sensor 71, described later.

Note that turning on and off of driving of mist collector 31 and fume collector 41 may be designated by the operator through an operation panel (not shown).

Control device 321 controls operation of first switching valve 61 so that first switching mode 61S is selected in the subtractive manufacturing for a workpiece, and second switching mode 61T is selected in the additive manufacturing for a workpiece.

More specifically, control device 321 further includes a valve control part 324. Valve control part 324 determines which one of processes that are the subtractive manufacturing and the additive manufacturing for a workpiece is executed with reference to the execution program executed by program execution part 323. If valve control part 324 determines that the subtractive manufacturing for a workpiece is executed, valve control part 324 controls first actuator 64 so that first switching mode 61S is selected at first switching valve 61. If valve control part 324 determines that the additive manufacturing for a workpiece is executed, valve control part 324 controls first actuator 64 so that second switching mode 61T is selected at first switching valve 61.

Control device 321 controls operation of second switching valve 66 so that while powder feeder 170 is not being replenished with powder, third switching mode 66S is selected, and while powder feeder 170 is being replenished with powder, fourth switching mode 66T is selected.

More specifically, processing machine 100 further includes door opening and closing sensor 71. Door opening and closing sensor 71 can detect the position of door part 237. Door opening and closing sensor 71 is provided at second cover body 230. Door opening and closing sensor 71 may be a non-contact type proximity sensor, or a contact type limit sensor. Door opening and closing sensor 71 outputs a detection signal pertaining to door part 237, to valve control part 324 and external device control part 328.

Valve control part 324 and external device control part 328 determine whether door part 237 is in the open state or the closed state, based on the detection signal from door opening and closing sensor 71. If valve control part 324 determines that door part 237 is in the closed state, valve control part 324 controls second actuator 69 so that third switching mode 66S is selected at second switching valve 66. If valve control part 324 determines that door part 237 is in the open state, valve control part 324 controls second actuator 69 so that fourth switching mode 66T is selected at second switching valve 66.

As shown in FIGS. 3 and 5, in the subtractive manufacturing for a workpiece, as the workpiece is processed using coolant, mist occurs in machining area 200. In this case, first switching valve 61 is operated in first switching mode 61S. Accordingly, first pipe 51 and second pipe 52 communicate with each other. Consequently, the mist occurring in machining area 200 can be guided to mist collector 31 through first pipe 51 and second pipe 52. Since first pipe 51 and third pipe 53 are shut off from each other, the mist is prevented from being guided to fume collector 41 through first pipe 51 and third pipe 53.

As shown in FIGS. 4 and 6, in the additive manufacturing for a workpiece, as the workpiece is processed using laser light, fumes occur in machining area 200. In this case, first switching valve 61 is operated in second switching mode 61T. Accordingly, first pipe 51 and third pipe 53 communicate with each other. Consequently, the fumes occurring in machining area 200 can be guided to fume collector 41 through first pipe 51 and third pipe 53. Since first pipe 51 and second pipe 52 are shut off from each other, the fumes are prevented from being guided to mist collector 31 through first pipe 51 and second pipe 52.

As shown in FIGS. 3 and 4, while powder feeder 170 is not replenished with powder, door part 237 provided for second cover body 230 is in the closed state. In this case, second switching valve 66 is operated in third switching mode 66S. As shown in FIG. 4, while powder feeder 170 is not replenished with powder in the additive manufacturing for a workpiece, third pipe 53 and fourth pipe 54 are shut off from each other. Accordingly, no airflow from storage space 220 toward fume collector 41 is formed, and only airflow from machining area 200 to fume collector 41 is formed. Accordingly, fumes occurring in machining area 200 can be more efficiently collected by fume collector 41.

As shown in FIGS. 5 and 6, while powder feeder 170 is being replenished with powder, door part 237 provided for second cover body 230 is in the open state. As the operator performs the powder replenish operation, powder is scattered in storage space 220. In this case, second switching valve 66 is operated in fourth switching mode 66T. Accordingly, third pipe 53 and fourth pipe 54 communicate with each other. Consequently, airflow is formed from storage space 220 toward fume collector 41. Accordingly, powder scattered in storage space 220 can be collected by fume collector 41.

The structure of processing machine 100 according to the embodiment of the present invention described above is summarized as follows. Processing machine 100 according to this embodiment includes: first cover body 210 that compartmentally forms machining area 200; mist collector 31 that is for collecting mist from machining area 200; fume collector 41 that is for collecting fumes from machining area 200; first pipe 51 that is connected to first cover body 210, and communicates with machining area 200; second pipe 52 and third pipe 53 that branch off from first pipe 51, and are respectively connected to mist collector 31 and fume collector 41; and first switching valve 61 that is operable between first switching mode 61S in which first pipe 51 and second pipe 52 communicate with each other, and first pipe 51 and third pipe 53 are shut off from each other, and second switching mode 61T in which first pipe 51 and second pipe 52 are shut off from each other, and first pipe 51 and third pipe 53 communicate with each other.

According to processing machine 100 in the embodiment of the present invention configured as described above, the connection place of pipes to first cover body 210 can be confined in a compact range, while mist occurring during additive manufacturing for a workpiece can be appropriately collected by mist collector 31 and fumes occurring during subtractive manufacturing for a workpiece can be appropriately collected by fume collector 41.

Note that in this embodiment, processing machine 100 that can perform the cutting machining for a workpiece and the additive manufacturing for a workpiece is described. The present invention is not limited to this, and may be applied to a processing machine that can perform the workpiece cutting machining and the workpiece laser processing.

The embodiment disclosed here is described as an example in all respects, and should not be construed to be limitative. The scope of the present invention is not indicated by the above description but is indicated by the claims. It is intended to encompass equivalent meanings of the claims, and all modifications in the range.

INDUSTRIAL APPLICABILITY

The present invention is applied to, for example, a hybrid-type processing machine that can perform the subtractive manufacturing for a workpiece, and the additive manufacturing for a workpiece.

REFERENCE SIGNS LIST

31 Mist collector; 32, 42 Motor; 41 Fume collector; 51 First pipe; 51p First connection part; 52 Second pipe; 52p Second connection part; 53 Third pipe; 53p Third connection part; 54 Fourth pipe; 54p Fourth connection part; 56 First branch part; 57 Second branch part; 61 First switching valve; 61S First switching mode; 61T Second switching mode; 62 First stem; 63 First valve body; 64 First actuator; 66 Second switching valve; 66S Third switching mode; 66T Fourth switching mode; 67 Second stem; 68 Second valve body; 69 Second actuator; 71 Door opening and closing sensor; 100 Processing machine; 101, 102, 103 Rotation axis; 104 Swing axis; 106 Central axis; 111 First workpiece spindle; 116 Second workpiece spindle; 121 Tool spindle; 122 Spindle end face; 131 Tool rest; 132 Swing part; 136 Bed; 141 Additive manufacturing head; 143 Line body; 146 Head main body; 147 Laser tool; 170 Powder feeder; 171 Mixer part; 172 Powder hopper; 176 Laser oscillating device; 200 Machining area; 210 First cover body; 220 Storage space; 230 Second cover body; 236 Opening part; 237 Door part; 321 Control device; 322 Program storage part; 323 Program execution part; 324 Valve control part; 325 Tool spindle control part; 326 Workpiece spindle control part; 327 Powder supply control part; 328 External device control part; 329 Tool spindle motor; 330 Tool spindle feeding motor; 331 Workpiece spindle motor; 332 Coolant pump.

The invention claimed is:

1. A processing machine, comprising:
a first cover body that compartmentally forms a machining area;
a mist collector that is for collecting mist from the machining area;
a fume collector that is for collecting fumes from the machining area;
a first pipe that is connected to the first cover body, and communicates with the machining area;
a second pipe and a third pipe that branch off from the first pipe, and are respectively connected to the mist collector and the fume collector; and
a first switching valve that is operable between a first switching mode in which the first pipe and the second pipe communicate with each other, and the first pipe and the third pipe are shut off from each other, and a second switching mode in which the first pipe and the second pipe are shut off from each other, and the first pipe and the third pipe communicate with each other.

2. The processing machine according to claim 1, wherein the first switching valve is provided at a branch position between the first pipe, and the second pipe and the third pipe.

3. The processing machine according to claim 1, further comprising a control device that controls operation of the first switching valve so that the first switching mode is selected in subtractive manufacturing for a workpiece, and the second switching mode is selected in additive manufacturing for a workpiece.

4. The processing machine according to claim 1, further comprising:
a powder feeder that is for supplying powder toward an inside of the machining area;
a second cover body that compartmentally forms a space that stores the powder feeder;
a fourth pipe that branches off from a pipe path of the third pipe, is connected to the second cover body, and communicates with the space; and
a second switching valve that is operable between a third switching mode in which the third pipe and the fourth pipe are shut off from each other, and a fourth switching mode in which the third pipe and the fourth pipe communicate with each other.

5. The processing machine according to claim 4, further comprising a control device that controls operation of the second switching valve so that while the powder feeder is not being replenished with powder, the third switching mode is selected, and while the powder feeder is being replenished with powder, the fourth switching mode is selected.

* * * * *